3,004,851
LIGHT SENSITIZED COATING COMPOSITIONS AND THE PRODUCTION THEREOF

Clarence A. Brown, Toledo, Ohio, assignor, by mesne assignments, to Jones Graphic Products of Ohio, Inc., a corporation of Ohio
No Drawing. Filed Dec. 2, 1957, Ser. No. 699,931
15 Claims. (Cl. 96—93)

This invention relates to light sensitized coating compositions and to the production thereof, and, more particularly, to such coatings and their production from an acrylic monomer and an at least partially hydrolyzed polyvinyl alcohol.

Various light sensitized coating compositions have been known, and have been widely used. For example, dichromated water solutions of gelatin, fish glue, gum arabic and albumin, and dichromated solutions of shellac in ammonia water are well known, and can be coated on any of various bases, usually metal plates, paper plates, or metal bodies other than plates to produce a light sensitive coating. Such coating can then be exposed to light in a desired design to insolubilize the exposed portions, or at least to convert them to a hydrophobic condition. In some processes, the unexposed portions of the coating are then removed from the base, either to expose an ink repellent substrate or to expose a substrate which is subsequently to be removed by an etching process. When the substrate exposed is ink repellent, and the exposed portions of the coating are ink receptive, the article which is produced can be utilized directly as a printing plate by applying ink thereto; the applied ink is accepted only by the remaining exposed portions of the coating, which constitute an image, and is rejected by the metal substrate, so that a desired impression can be made on paper, either directly or after transfer of ink from the plate to a suitable blanket. Usually, when this technique is employed, an aqueous fountain solution is also applied to the plate to increase the ink repellent nature of the exposed substrate. When the base is etched after removal of the unexposed portions of a coating, a letter press printing plate may be produced by the etching operation, or undesired portions of a casting, die casting, forged part, or the like may be removed to a desired extent. In any event, when etching is employed, the function of the light sensitized coating is to prevent etching of selected portions of the base. The pattern of the protected portions corresponds with the pattern in which the light sensitive coating was exposed to light.

There is a substantial need for light sensitized coating compositions which can be used to produce coatings in a desired design, and where the coatings have greater resistance, both mechanical and chemical, than presently available coatings. For example, when such a coating constitutes the ink receptive portion of a printing plate, the life of the printing plate depends upon the ability of the exposed portions of the coating to withstand prolonged contact both with ink and with suitable fountain solutions, and also upon the ability of the exposed portions of the coating to withstand the mechanical abrasions to which it is subjected during the printing operation. Presently available light sensitized coating compositions produce coatings which have a degree of mechanical and chemical resistance sufficient that a few thousand impressions can be made, but, thereafter, the plates are worthless. As a consequence, when many thousands of impressions are to be made it is usually preferred to employ a more expensive process, which process usually involves etching, to produce a plate having a much greater useful life. A sensitized coating composition having greater chemical and mechanical resistance would, therefore, be highly advantageous in this printing operation.

In addition, there is a substantial need for improved light sensitized coating compositions for use in etching operations. A particular characteristic of such compositions in which improvement is needed is chemical resistance. For example, greater acid or alkali resistance is required where comparatively deep etching is to be carried out, especially in removing undesired portions of castings or the like, and also where recently developed improved etching solutions are employed. Such improved etching solutions usually comprise both an acid or acid composition and an organic solvent or solvent composition, and prevent lateral etching so that "banking" or "powdering" of a plate is unnecessary, and any given etching operation can be accomplished much more rapidly than with conventional water solutions of acids. In addition, however, these etching baths also attack well known coatings which can be used to protect portions of a substrate which are to remain unetched, and such attack is at a faster rate than when the more conventional water solutions of acids are used. As a consequence, deeper etching can, in most instances, be accomplished with conventional water solutions of acids than with the new etching baths.

The present invention is based upon the discovery that a thermal reaction product of methyl methacrylate monomer with an aqueous dispersion of a polyvinyl alcohol constitutes a coating composition, and that the addition of a dichromate to the resulting reaction product makes it light-sensitive. Light exposed portions of a coating produced from the resulting composition have been found to have greatly improved mechanical and chemical resistance, by comparison with coatings produced from previously known compositions.

It is, therefore, an object of the invention to provide an improved light sensitized coating composition.

It is a further object of the invention to provide a method for producing an improved light sensitized coating composition.

Other objects and advantages will be apparent from the description which follows, which is intended only to illustrate and disclose, but in no way to limit, the invention.

According to the invention an improved light sensitized coating composition is provided. Such composition is an aqueous dispersion of from 0.2 percent to 1.2 percent of a dichromate and from 5 percent to 25 percent of a thermal reaction product of from 0.7 part to 2.5 parts of an acrylic monomer and 1 part of an at least partially hydrolyzed polyvinyl alcohol.

The terms "percent" and "parts" are used herein, and in the appended claims, to refer to percent and parts by weight, unless otherwise indicated.

The term "dispersion" is used in its usual generic sense as including solutions, suspensions, emulsions and other stable solid in liquid or liquid in liquid compositions.

The foregoing general description of a coating composition in accordance with the invention will be clarified by the following example, which describes the production of such a composition by a preferred method.

EXAMPLE 1

A charge of 625 milliliters of methyl methacrylate monomer which had been freshly washed with a 20 percent solution of sodium hydroxide in water to remove hydroquinone, which is a polymerization inhibitor, was placed in a first container. A 3381 milliliter charge of a 10 percent dispersion of polyvinyl alcohol in water was heated to 75° C. and placed in a second container. The particular polyvinyl alcohol employed was 86 to 89 percent hydrolyzed, and had a comparatively low molecular weight as indicated by a viscosity, in a 4 percent water solution at 20° C., of 4 to 6 centipoises. The polyvinyl alcohol dispersion was flow by gravity from the second container, through a pipe, through a 750 cc. capacity homogenizer, and was circulated back to the second container by the pumping action of the homogenizer. Methyl methacrylate monomer was flow by gravity from the first container through a second pipe and into the stream of polyvinyl alcohol dispersion flowing from the second container to the homogenizer. By adjustment of valves in the pipe from the first container and in the pipe from the second container to the homogenizer, the rates of flow of the methyl methacrylate monomer and of the polyvinyl alcohol dispersion were adjusted to about 30 cc. per minute and 150 cc. per minute, respectively, until the homogenizer was filled with polyvinyl alcohol dispersion and methyl methacrylate monomer. The homogenizer was then driven at approximately 8,000 revolutions per minute to homogenize the liquids and to circulate liquid from the homogenizer back to the second container. A 2 milliliter portion of a 30 percent hydrogen peroxide solution was then added to the second container, at which time the liquid temperature in the homogenizer was found to be 65° C. The homogenizer was then slowed at 4,000 revolutions per minute. Four additional 2 milliliter portions of the hydrogen peroxide were made to the liquid in the second container at two minute intervals. The temperature of the liquid in the homogenizer was observed to be 72° C. at the time the fifth hydrogen peroxide addition was made. When all of the methyl methacrylate monomer had been added to the system from the first container, the valve in the line from the first container was closed to prevent introduction of air into the system. The temperature of the liquid in the homogenizer was found to increase rapidly to 84° C. approximately 12 minutes after the first hydrogen peroxide addition, and then to drop to about 82° C. approximately 5 minutes later, at which time the homogenizer speed was increased to 8,000 revolutions per minute. The temperature therein then increased to about 87° C. in an additional 15 minutes, after which time a uniform dispersion having a milky appearance was removed from the system. This dispersion had a viscosity of 275 centipoises at 80° F., a pH of 5.1, and a density of 6.0° Baumé at 60° F. The dispersion was diluted with about 800 cc. of distilled water to a viscosity of 29.0 centipoises at 80° F. A 3595.3 milliliter portion of the resulting dispersion was made light sensitive by adding thereto a 190 milliliter portion of a dichromate solution which had been prepared by dissolving a 0.073 pound portion of ammonium dichromate in 0.048 gallon of distilled water heated to 130° F. and, after dissolution of the ammonium dichromate, cooled to 80° F. and adjusted to a density of 12.1° Baumé by addition thereto of distilled water at 80° F.

A portion of the dichromated dispersion produced as described above was poured onto a magnesium plate while the plate was positioned on a platform which was rotating at approximately 80 revolutions per minute, and a stream of air at a temperature of about 120° F. was directed against the coating on the magnesium plate to effect drying thereof. The dried coating was then fully exposed to light from a carbon arc; the exposed coating was washed with water; and the exposed and washed coating was then heated to about 500° F. to effect hardening thereof. The plate covered by the hardened coating was then positioned on a support inclined about 20° to the horizontal with the coating facing upwardly, and a stream of an 8.2 percent nitric acid solution at a temperature of about 96° F. was flowed down over the hardened coating. The acid from the stream was collected in a reservoir and recirculated over the coating, so that exothermic heat of reaction gradually raised the temperature of the acid, such temperature having been 106° F. after 30 minutes. The hardened coating was found to resist the action of the acid for a period of 101 minutes before failure occurred. In a second test, where the initial acid temperature was 90° F., the coating resisted the acid for 155 minutes before failure.

When, for purposes of comparison, but not in accordance with the invention, the procedure described above was carried out to produce a hardened coating from a dichromated dispersion of the same polyvinyl alcohol, and the coating, after exposure and water washing, was washed with a 3 percent solution of chromic acid, it was found that the hardened coating resisted the action of the 96° F. nitric acid solution for only 13 minutes. When the exposed polyvinyl alcohol coating on the magnesium plate was washed with approximately a 1 percent logwood dispersion, instead of with water, and then with a 2 percent solution of chromic acid, as is disclosed and claimed in a copending application Serial No. 502,554, now U.S. Patent 2,830,899, the coating, after heat hardening, was found to withstand the action of the 96° F. nitric acid solution for 42 minutes. Unless a coating produced from a polyvinyl alcohol dispersion is washed with a chromic acid solution or with a logwood dispersion and then a chromic acid solution, the coating after heating, will resist the 8.2 percent nitric acid solution for not more than about 1 minute. It has been found that the acid resistance of the identified hardened polyvinyl alcohol coating, when the step of washing with a 1 percent logwood dispersion is employed, is sufficient for many printing plate applications, including those where the previously mentioned new etching solutions are employed, but insufficient where other presently available, and even further improved, etching solutions are used, and also insufficient for use in many instances where parts of a casting or the like are to be etched away. The substantially increased acid resistance of the identified coating produced from the dichromated dispersion described in Example 1 is, therefore, highly significant, particularly since other known light sensitized coating materials have even lower acid resistances than those produced from a polyvinyl alcohol dispersion, and washed with a logwood dispersion, and chromic acid, as indicated.

It will be appreciated that various acrylic monomers can be used in place of methyl methacrylate monomer in producing a light sensitized coating material according to the invention. For example, esters of methacrylic acid other than the methyl ester can be employed, and methacrylic acid itself is also suitable. In addition, acrylic acid and its esters are also suitable, as are other derivatives, both acids and esters, of acrylic acid where a radical other than methyl is attached to the alpha carbon. Such acrylic monomers can be represented by the generic formula

wherein R and R' can be the same or different, and each is hydrogen or an organic radical. When either R or R' is an organic radical, it is usually a lower alkyl radical, or an alkyl radical having from 1 to 4 carbon atoms. Many such acrylic monomers are known, and various ways for producing them are likewise known.

Various polyvinyl alcohols other than that specifically identified in Example 1 can also be used in producing a light sensitized coating composition according to the invention. It is usually preferred that the polyvinyl alcohol be of a low or medium degree of polymerization, as indicated by its producing a 4 percent water dispersion having a viscosity at 20° C. of from about 4 centipoises to about 28 centipoises. It is also preferred that the polyvinyl alcohol be one which is at least 75 percent hydrolyzed, which means that at least 75 percent of the acetate groups of the corresponding polyvinyl acetate have been replaced by hydroxyl groups. Optimum results have been achieved when the polyvinyl alcohol was hydrolyzed to the extent of from about 80 percent to about 95 percent.

The hydrogen peroxide solution utilized in accordance with the procedure described in Example 1, above, is a catalyst for the addition polymerization of methyl methacrylate. The use of such a catalyst, whether hydrogen peroxide or another known catalyst, for example another peroxide, an ozonide, or the like, constitutes one preferred way for producing reaction products. It will be noted that the reaction mix described in Example 1 reached a temperature of 89° C. approximately 11 minutes after the hydrogen peroxide solution was added. No boiling of the reaction mixture was noted, even though a dispersion of methyl methacrylate monomer in the indicated polyvinyl alcohol will boil at about 83° C. The absence of boiling, therefore, indicates that reaction proceeded at an extremely rapid rate under the conditions described. Such reaction is believed to involve both polymerization of the methyl methacrylate monomer and trans-esterification between the polyvinyl alcohol molecules and the methyl methacrylate. Such trans-esterification is believed to produce what might be described as a polyvinyl alcohol methacrylate and free methyl alcohol. The conclusion that trans-esterification occurs is based upon the characteristics of coatings produced from the reaction products, while the conclusion that polymerization also occurs is based upon the substantial rise in temperature after addition of the hydrogen peroxide solution, the absence of any evidence of boiling in the reacting dispersion, and the comparatively high viscosity of the reaction products. It has been observed experimentally that it is essential to achieve high acid resistance by this method, that the reaction mixture be brought to or maintained at a comparatively high temperature, usually at least 65° C. According to the procedure described in Example 1, the reaction mixture was heated to a temperature higher than the boiling temperature of the initial mixture. When such a temperature is achieved, it is preferred to maintain the mixture for at least about 15 minutes, in the presence of a catalyst and at a temperature of at least 65° C., but below the initial boiling temperature, and then to increase the temperature to a desired higher point. For example, when a coating composition was prepared by repeating the procedure described in Example 1, except that the homogenizer was operated at about 8,000 revolutions per minute throughout the entire reaction cycle, a coating produced from the composition, in the way described in Example 1, was found to resist the 8.2 percent nitric acid solution at an initial temperature of 96° F. for only 76 minutes. While this indicates an extremely high acid resistance by comparison with previously known light sensitized coating compositions, it indicates substantially lower acid resistance than when the homogenizer is slowed, as in Example 1. The liquid, within the homogenizer, is subjected to substantial frictional forces, which not only homogenize and mix the liquid, but also are dissipated in heat. For example, when a polyvinyl alcohol dispersion and methyl methacrylate, both at room temperature, were circulated by the homogenizer as described in Example 1, friction within the homogenizer raised the liquid temperature therein to 65° C. in about 45 minutes. When the rotational speed of the homogenizer is decreased, as described in Example 1, friction exerted by the homogenizer is decreased, and the rate at which the liquid is heated is also decreased. In the procedure just described, where the homogenizer was operated at 8,000 revolutions per minute throughout the entire cycle, the liquid temperature therein increased from 65° C., when the first hydrogen peroxide addition was made, to 87° C. in about 8 minutes. The reaction product had a viscosity of 347.5 centipoises at 80° F.

The coating composition produced as described above, where the temperature increased from 65° C. to 87° C. in about 8 minutes (this composition is hereinafter, for convenience, referred to as composition No. 2), was also less desirable from another standpoint than the composition produced as described in Example 1 (this composition is hereinafter, for convenience, referred to as composition No. 1). When composition No. 1 was applied to a suitable base plate, as described in Example 1, and exposed to light through a suitable negative, so that only certain selected portions of the coating were exposed and insolubilized, the unexposed portions of the coating could be washed from the plate with water, leaving a relatively fragile film on the portions of the plate from which most of the unexposed coating had been washed. This remaining film had only limited acid resistance, and could be removed easily, and without damage to the exposed portions of the coating, by wiping a fairly concentrated nitric acid solution, for example a 15 to 25 percent solution, over the entire plate. Such wiping can conveniently be carried out with a cotton cloth. The fragile film which remains in the unexposed portions of a plate which has been coated with the No. 2 composition can also be removed in this way, but only with greater difficulty than can the film which remains on a plate which has been coated with the No. 1 composition. When accurate reproduction of a photographic image by a etched pattern on a plate is desired it is important to remove this fragile film before the etching operation is commenced, because, in usual etching practices, the film will break down unevenly, and cause irregular etching if it remains on the plate when etching is commenced. The No. 1 coating composition is, therefore, preferred over the No. 2 composition for this further reason.

The difference between the No. 1 composition and the No. 2 composition discussed in the preceding paragraph is believed also to support the previously suggested theory that both trans-esterification between the acrylic monomer and the polyvinyl alcohol and addition polymerization of the acrylic monomer occur in producing a coating composition according to the invention. Since composition No. 2 had a higher viscosity (347.5 centipoises) than did composition No. 1 (235 centipoises), it is believed that addition polymerization of the methyl methacrylate monomer proceeded to a greater extent in composition No. 2. However, composition No. 1 had greater acid resistance than did composition No. 2, and also left a more fragile residue on unexposed plate portions. The greater acid resistance is observed after the exposed coating has been heated to about 500° F., and probably means a higher molecular weight at such time. The higher viscosity of the No. 2 composition, as produced, probably indicates a higher average molecular weight for the solids therein at this intermediate stage in processing. The fragile film, however, before removal thereof, was subjected to the same elevated temperature as the exposed coating portions, so that it had the same opportunity to achieve increased acid resistance as did the film from the No. 1 composition. The greater ease of removal thereof suggests that some reaction other than polymerization of the methyl methacrylate monomer, which other reaction is believed to be trans-esterification, occurred to a greater extent in producing the No. 1 composition than in producing the No. 2 composition. The available data, therefore, suggests that relatively lower temperatures favor trans-esterification, while relatively higher temperature favor addition polymerization, and that both reactions proceed in relatively short times. Maintaining a reaction mixture, in producing a composition according to the invention, at a temperature above 65° F. but below its initial boiling point for at least about 15 minutes is, therefore, preferred for this further reason. It is also preferred, in order to achieve high acid resistance, that the reaction mixture be heated to at least 70° C., and, most desirably, to at least 75° C. It is also preferred that the amount of a catalyst of the peroxide, ozonide or the like type used, based upon the total weight of the acrylic monomer, be from 0.1 percent to 1.5 percent.

It has been found that the ratio of the acrylic monomer to polyvinyl alcohol used in producing a composition according to the invention is important. In general, a low ratio produces a composition having comparatively low acid resistance, while a high ratio is difficult to process, and produces a composition which leaves a more resistant film on unexposed plate portions. In general, the reaction product can be made with from about 0.7 part to about 2.5 parts of the acrylic monomer per part of polyvinyl alcohol. It is preferred, however, to use from about 1 part to about 2 parts of the monomer, and optimum results have been achieved by using from 1.5 to 1.9 parts of the acrylic monomer per part of the polyvinyl alcohol.

EXAMPLE 2

Various procedures similar to that described in Example 1, and which have been employed to produce compositions according to the invention from an acrylic monomer and an identical polyvinyl alcohol dispersion are outlined in Table I, below:

acid solution at an initial temperature of 90° C, are given in Table III, below:

*Table III*

| Composition No. | Minutes hardened coating resisted acid before failure |
|---|---|
| 7 | 146 |
| 9 | 133 |

In still another series of acid resistance tests, metal plates carrying coatings produced from compositions 2, 4, 5, 6, 10 and 11 were subjected to the action of the 8.2 percent solution of nitric acid at an initial temperature of 84° F. The exothermic reaction heated this solution to 94° F. 60 minutes after the test was started. The test was continued for a period of 115 minutes, at which time coatings producted from compositions 2, 4, 6 and 11 had not failed when the test was concluded. On the basis of their physical characteristics at the end of the test, however, they were ranked for acid resistance. The coating from No. 6

*Table I*

| Composition No. | Methyl Methacrylate | | Polyvinyl alcohol Dispersion | | Liquid temperature in homogenizer at time of catalyst addition, ° C. | Catalyst identity | Catalyst cubic centimeters | Maximum reaction temp., ° C. | Reaction time in minutes after catalyst addition |
|---|---|---|---|---|---|---|---|---|---|
| | Monomer grams | Temperature, ° C. | Grams | Temperature, ° C. | | | | | |
| 3 | 585 | 25 | 3,485 | 65 | 65 | $H_2O_2$ [a] | 5 | 92 | 32 |
| 4 | 585 | 25 | 3,485 | 65 | 65 | Benzoyl peroxide | [b] 4.5 | 90 | 32 |
| 5 | 295 | 25 | 3,780 | 65 | 65 | $H_2O_2$ [c] | 10 | 80 | 26 |
| 6 | 754 | 25 | 3,275 | 65 | 65 | $H_2O_2$ [c] | 10 | 94 | 32 |
| 7 | 585 | 25 | 3,485 | 25 | 35 | $H_2O_2$ [d] | 10 | 87 | 58 |
| 8 | [e] 550 | 25 | 3,485 | 65 | 65 | $H_2O_2$ [c] | 10 | 82 | 32 |
| 9 | 585 | 25 | 3,485 | 65 | 65 | $H_2O_2$ [c] | 10 | 75 | 42 |
| 10 | 440 | 25 | 3,620 | 65 | 65 | $H_2O_2$ [c] | 10 | 84 | 22 |
| 11 | 670 | 25 | 3,485 | 65 | 65 | $H_2O_2$ [c] | 10 | 89 | 36 |

[a] Two additions of 2-cubic centimeters each of a 30% solution of $H_2O_2$ and one 1-cubic centimeter addition were made at 2-minute intervals.
[b] Grams. The benzoyl peroxide was added in five 0.9 gram portions at 2-minute intervals.
[c] Five additions of 2-cubic centimeters each of a 30% solution of $H_2O_2$ were made at 2-minute intervals.
[d] A single 10-cubic centimeter addition of a 30% solution of $H_2O_2$ was made.
[e] The monomer used was prepared by dissolving about 1 part of transparent polymethyl methacrylate in 9 parts of methyl methacrylate monomer.

The various compositions identified in Table I were adjusted to a viscosity of 29.0 centipoises at 80° F. and sensitized to light with ammonium dichromate as described in Example 1. Each of the sensitized compositions was then applied to a metal base plate as a coating; the coating was dried, exposed to light, washed and heat hardened as described above; and each of the coatings was tested for acid resistance, as described. The results of such tests, where the initial temperature of the 8.2 percent nitric acid solution was 96° F. are presented in Table II, below:

*Table II*

| Composition No. | Minutes hardened coating resisted acid before failure |
|---|---|
| 3 | 183 |
| 4 | 193 |
| 5 | 30 |
| 6 | 193 |
| 7 | 111 |
| 8 | 76 |

The number of minutes coatings produced from various ones of the compositions resisted the 8.2 percent nitric was considered to have the best acid resistance; that from No. 11 the second best; that from No. 4 the third best; and that from No. 2 the fourth best. The acid resistance of each of the other coatings is given in Table IV, below:

*Table IV*

| Composition No. | Minutes hardened coating resisted acid before failure |
|---|---|
| 5 | 62 |
| 10 | 83 |

In still another series of tests, magnesium plates carrying coatings produced from compositions 2, 4, 5, 6, 10 and 11 were exposed to light through a negative most of which was transparent, but which included a solid opaque portion approximately ½″ x ¾″ and a second portion of approximately the same size with a fine overall dot pattern. After washing of each of the exposed plates with water, and heat hardening at 500° F., as described above, each of the plates was treated with a 0.4 percent solution of nitric acid at an initial temperature of 74° F., and the time required for etching to start in each of the portions of the plate corresponding with the opaque portions of the negative was observed. The results of this test are presented in Table V, below:

Table V

| Coating produced from composition No. | Time in minutes for etching to start in the plate portion corresponding with the solid opaque negative area | Time in minutes for etching to start in the portion of the plate corresponding with the dot pattern of the negative |
|---|---|---|
| 2 | ¹ 8 | ¹ 31 |
| 4 | 4 | 1 |
| 5 | ½ | 1 |
| 6 | (¹) | ¹ 16 |
| 10 | ½ | 1 |
| 11 | 2 | 3 |

¹ Etching was uneven in the sense that it started, if at all, only in certain of the unexposed portions of the plate, with the result that the etched pattern was extremely uneven.

It will be understood that a light sensitized coating according to the invention is insolubilized by exposure to light. The time of exposure necessary to cause insolubilization depends upon coating thickness, intensity of a light source, proximity of the coating being exposed to the light source, and the amount of dichromate present therein. It has been found that, for coatings produced as described above, exposures to a carbon arc positioned about 24 inches from a coated plate, and ranging from about two minutes to about four minutes, insolubilizes exposed portions while unexposed portions remain water soluble. Longer exposures are not detrimental, so long as the portions of the coating which are intended to remain water soluble are not insolubilized incidentally. There is no reason, however, for prolonged exposures. Progressively shorter exposure times accomplish progressively less insolubilizing of the exposed portions, the ultimate being that both exposed and unexposed portions can readily be washed from the plate. For example, while a three minute exposure caused sufficient insolubilizing to enable separation of exposed and unexposed portions by water washing of plates produced by the procedures described above, a 15 second exposure to the same carbon arc, and at the same distance, resulted in only partial insolubilization of the exposed portions, so that separation was difficult. The exposed portions tended to wash from the plate during removal of the unexposed portions.

It is to be understood that light sensitized coating compositions according to the invention produced, as previously discussed in detail, from an acrylic monomer and a polyvinyl alcohol, and in the presence of a polymerization catalyst for the acrylic monomer, are suitable for use in perhaps 90 to 95 percent of the applications for light sensitized coatings. However, when extremely small unexposed areas of the coating must be removed, for example, shadow dots in fine screen printing plate work, the difficulty involved in removing the relatively fragile film which has previously been discussed is sufficiently great that the use of such a coating composition is impractical. Where such film constitutes a problem, a modified method for producing a coating composition in accordance with the invention is preferred. This second preferred method for producing reaction products involves carrying out reaction between the acrylic monomer and the polyvinyl alcohol dispersion in the presence of an inhibitor such as hydroquinone for addition polymerization of the acrylic monomer. When the reaction is carried out in this way, the reaction can advantageously be carried out at a temperature below 80° C. for an extended period of time, and either under reflux or in a pressure vessel to prevent loss of volatile components of the reaction mixture. Coatings produced from such reaction mixtures, after application to a suitable base such as magnesium, exposure, washing, and heat hardening, as described in Example 1, have been found to resist the action of a 6.7 percent nitric acid solution for approximately 130 minutes, and can, therefore, be considered to have essentially the same acid resistance as the coatings of Example 1. It has also been noted that the final viscosities of dispersions produced in the presence of an inhibitor increase only comparatively slightly from the viscosities of the initial polyvinyl alcohol dispersions. For example, a viscosity increase of from about 10 percent to about 40 percent can be expected when reaction is carried out in the presence of an inhibitor, whereas a viscosity increase of from 800 to 1000 percent is often encountered when the reaction is carried out in the presence of a catalyst for the addition polymerization of the acrylic monomer.

The facts set forth in the preceding paragraph are considered to substantiate the reaction mechanism which has previously been suggested, that both trans-esterification and addition polymerization occur when a dispersion comprising an acrylic monomer and a polyvinyl alcohol is heated in the presence of a polymerization catalyst. Both the rapid temperature rise, indicating exothermic reaction, and the substantial increase in viscosity suggest that polymerization of the acrylic monomer has occurred, which is to be expected during heating in the presence of a polymerization catalyst. However, as has been discussed, when heating occurs too rapidly, a coating produced from the resulting dispersion has low acid, even though rapid temperature rise and a many fold increase in viscosity suggest that the acrylic monomer has been polymerized. It follows that reaction between the polyvinyl alcohol and the acrylic material is essential to the accomplishment of high acid resistance. Such reaction is considered to be a trans-esterification, as indicated, which produces a polyvinyl alcohol acrylate material. Since an equivalent acid resistance, and, therefore, an equivalent dispersion can be produced by heating, in the presence of an inhibitor for the addition polymerization of the acrylic monomer, the modified procedure produces the trans-esterification product, without significant polymerization of the acrylic material, and polymerization occurs during the final heating after dichromating of the dispersion, application to a suitable base, exposure to light, and washing away of unexposed portions of the coating.

When the reaction product between a polyvinyl alcohol and an acrylic monomer is produced in the presence of an inhibitor for the polymerization of the acrylic monomer, it is usually preferred that the reaction be carried out at a relatively high temperature. When an open reaction vessel is used, reflux is advantageous, and reaction temperatures from about 60° C. to the boiling temperature of the reaction dispersion are suitable. Comparatively long reaction times are advantageous under such conditions. In fact, using a reaction temperature of about 80° C., and the reaction mixture described in Example 1, except that about 1 gram of hydroquinone was used instead of the hydrogen peroxide solution, evidence of continuing reaction was found as reaction was continued to about 24 hours. Specifically, it was found that acid resistance, measured as described in Example 1 of coatings produced from the reaction products increased as reaction time was increased from 8 hours to 16 hours and to 24 hours, while the ease of removal of the relatively fragile film in the unexposed portions also increased.

The amount of a polymerization inhibitor that is used in producing a reaction product in accordance with the second preferred method should be sufficient to prevent appreciable polymerization of the acrylic monomer under the actual reaction conditions employed. In the case of methyl methacrylate monomer reacted as described in the preceding paragraph, the amount of hydroquinone inhibitor ordinarily provided in the monomer by the manufacturer thereof is usually sufficient to prevent appreciable polymerization, as indicated by the relatively slight increase in viscosity of the dispersion after the reaction. The amount of any other polymerization inhibitor used should likewise be at least sufficient to prevent appreciable polymerization during reaction, and any of the many known inhibitors can be employed.

Any of the previously identified acrylic monomers and any of the polyvinyl alcohols, and in the proportions discussed above, can be reacted in accordance with this second preferred method to produce a light sensitized or sensitizable coating composition.

The following example illustrates the production of a reaction product of an acrylic monomer and a polyvinyl alcohol in the presence of an inhibitor for the polymerization of the acrylic monomer.

EXAMPLE 3

A 3-neck flask fitted with a stirrer, a reflux condenser and a thermometer was charged with a 676 milliliter portion of a 10 percent dispersion of the polyvinyl alcohol identified in Example 1 and a 125 milliliter portion of methyl methacrylate monomer having about 0.2 gram of hydroquinone dispersed therein. The stirrer was actuated, and the flask was heated in a water bath to maintain the charge therein at a temperature of approximately 80° C. The charge within the flask was maintained at approximately 80° C. for a 24 hour period, agitation being used throughout the reaction time. Two-hundred milliliter portions of the reaction products were removed from the flask as samples after 8 hours at temperature and after 16 hours at temperature. The samples removed were adjusted to a viscosity of 29 centipoises and sensitized with ammonium dichromate in the way described in Example 1, and a 200 milliliter portion of the final product, after 24 hours at temperature, was similarly adjusted in viscosity and sensitized. Magnesium plates were coated with the dichromated solution which resulted, fully exposed, washed with water and heat hardened and subjected to the action of an 8.2 percent nitric acid solution as described in Example 1. Second plates were also produced from each of the sensitized solutions, and were exposed to light through a photographic negative and a fine screen, washed with water, and heat hardened in the same way. These plates were then etched lightly to test for presence of a fragile film on the unexposed plate portions. The results of these tests are presented in Table VI, below:

*Table VI*

|  | Acid resistance in minutes | Condition of unexposed portions |
|---|---|---|
| Solution 1: | | |
| Plate 1 | 90 | |
| Plate 2 | | Small amounts of a fragile film adhered to most unexposed portions. |
| Solution 2: | | |
| Plate 1 | 100 | |
| Plate 2 | | Lesser amounts of a fragile film adhered to unexposed portions. |
| Solution 3: | | |
| Plate 1 | 120 | |
| Plate 2 | | A fragile film adhered only in the smallest unexposed areas such as shadow dots. |

The foregoing results indicate that, by the second preferred method, a coating composition in accordance with the invention is produce which can be utilized to effect even fine separation between exposed and unexposed portions of a printing plate or the like by a simple process requiring only the handling of harmless materials, manual manipulation being required only to break away a loosely adhering film in extremely small unexposed areas.

It will be apparent that various changes and modifications can be made from the specific details discussed herein and disclosed in the examples without departing from the spirit and scope of the attached claims.

What I claim is:

1. A light sensitized coating composition which is an aqueous dispersion of from 0.2 percent to 1.2 percent of a dichromate and from 5 percent to 25 percent of a product of the elevated temperature reaction between from 0.7 part to 2.5 parts of an acrylic ester monomer selected from the group consistnig of alkyl acrylates and alkyl methacrylates wherein the alkyl group has from 1 to 4 carbon atoms and one part of a partially hydrolyzed polyvinyl acetate wherein the extent of hydrolysis is from 75 to 95 percent.

2. A light sensitized coating composition which is an aqueous dispersion of from 0.2 percent to 1.2 percent of a dichromate and from 5 percent to 25 percent of a product of the elevated temperature reaction between from 0.7 part to 2.5 parts of an acrylic ester monomer selected from the group consisting of alkyl acrylates and alkyl methacrylates wherein the alkyl group has from 1 to 4 carbon atoms and one part of a partially hydrolyzed polyvinyl acetate wherein the extent of hydrolysis is from 75 to 95 percent, which reaction product is produced in the presence of a peroxide catalyst for the polymerization of the acrylic monomer.

3. A light sensitized coating composition which is an aqueous dispersion of from 0.2 percent to 1.2 percent of a dichromate and from 5 percent to 25 percent of a product of the elevated temperature reaction between from 0.7 part to 2.5 parts of an acrylic ester monomer selected from the group consisting of alkyl acrylates and alkyl methacrylates wherein the alkyl group has from 1 to 4 carbon atoms and one part of a partially hydrolyzed polyvinyl acetate wherein the extent of hydrolysis is from 75 to 95 percent, which reaction product is produced in the presence of an inhibitor for the polymerization of the acrylic monomer.

4. A light sensitized coating composition as claimed in claim 2 wherein the reaction product is of one to two parts of the acrylic monomer and one part of the polyvinyl acetate.

5. A light sensitized coating composition as claimed in claim 4 wherein the reaction product is of 1.5 to 1.9 parts of methyl methacrylate monomer and one part of the polyvinyl acetate.

6. A light sensitized coating composition as claimed in claim 3 wherein the reaction product is of one to two parts of the acrylic monomer and one part of the polyvinyl acetate.

7. A light sensitized coating composition as claimed in claim 6 wherein the reaction product is of 1.5 to 1.9 parts of methyl methacrylate monomer and one part of the polyvinyl acetate.

8. A method for producing a light-sensitized coating composition which comprises maintaining an agitated aqueous dispersion of from 0.7 part to 2.5 parts of an acrylic ester monomer selected from the group consisting of alkyl acrylates and alkyl methacrylates wherein the alkyl group has from 1 to 4 carbon atoms and one part of a partially hydrolyzed polyvinyl acetate wherein the extent of hydrolysis is from 75 to 95 percent at a temperature from about 60° C. to the boiling point of the dispersion for from about 10 minutes to about 2 hours, diluting the resulting dispersion with water to a predetermined viscosity, and dissolving a dichromate in the dispersion.

9. A method for producing a light-sensitized coating composition which comprises maintaining an agitated aqueous dispersion of from 0.7 part to 2.5 parts of an acrylic ester monomer selected from the group consisting of alkyl acrylates and alkyl methacrylates wherein the alkyl group has from 1 to 4 carbon atoms, a peroxide catalyst for the polymerization of the monomer, and one part of a partially hydrolyzed polyvinyl acetate wherein the extent of hydrolysis is from 75 to 95 percent at a temperature from about 60° C. to the boiling point of the dispersion for from about 10 minutes to about 2 hours, diluting the resulting dispersion with water to a predetermined viscosity, and dissolving a dichromate in the dispersion.

10. A method for producing a light-sensitized coating composition which comprises maintaining an agitated aqueous dispersion of from 0.7 part to 2.5 parts of an acrylic ester monomer selected from the group consisting of alkyl acrylates and alkyl methacrylates wherein the alkyl group has from 1 to 4 carbon atoms, an inhibitor for the polymerization of the monomer, and one part of a partially hydrolyzed polyvinyl acetate wherein the extent of hydrolysis is from 75 to 95 percent at a temperature from about 60° C. to the boiling point of the dispersion for from about 10 minutes to about 2 hours, diluting the resulting dispersion with water to a predetermined viscosity, and dissolving a dichromate in the dispersion.

11. A method as claimed in claim 9 wherein the dispersion includes from one to two parts of the monomer and one part of the polyvinyl acetate.

12. A method as claimed in claim 11 wherein the dispersion includes from 1.5 to 1.9 parts of methyl methacrylate monomer and one part of the polyvinyl acetate.

13. A method as claimed in claim 12 wherein the agitated aqueous dispersion is maintained at a temperature of at least 80° C. by exothermic heat of reaction which occurs therein, and the sensible heat of the reactants charged is the only source for heat supplied to the dispersion other than such heat of reaction.

14. A method as claimed in claim 10 wherein the dispersion includes from one to two parts of the monomer and one part of the polyvinyl acetate.

15. A method as claimed in claim 14 wherein the dispersion includes from 1.5 to 1.9 parts of methyl methacrylate monomer and one part of the polyvinyl acetate.

References Cited in the file of this patent

UNITED STATES PATENTS

| | | |
|---|---|---|
| 2,169,250 | Izard | Aug. 15, 1939 |
| 2,184,288 | Dangelmajer | Dec. 26, 1939 |
| 2,184,310 | Meigs et al. | Dec. 26, 1939 |
| 2,343,089 | Smith | Feb. 29, 1944 |